M. WARNE.
Artificial Bird-Target.
No. 224,254. Patented Feb. 3, 1880.
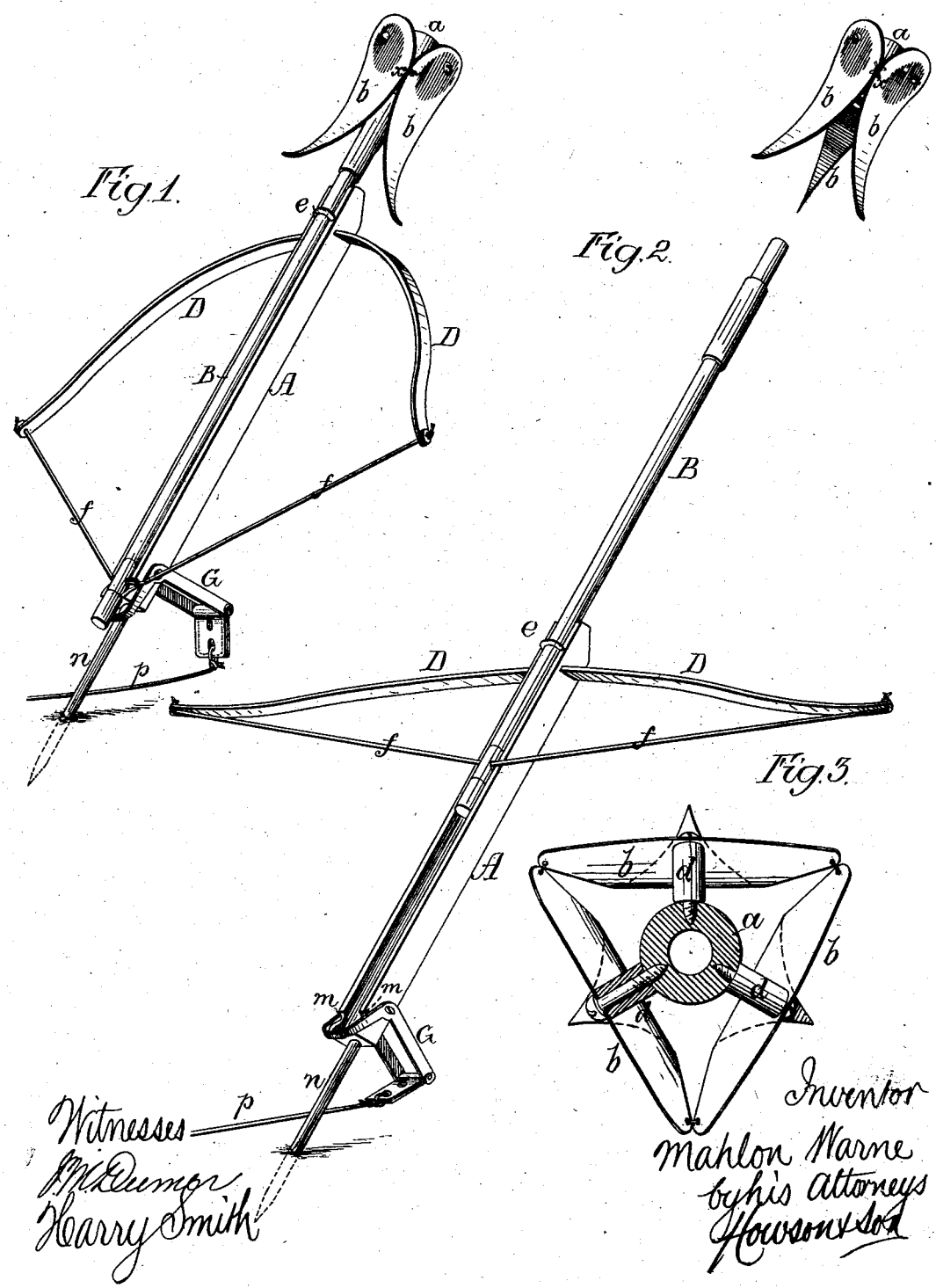

UNITED STATES PATENT OFFICE.

MAHLON WARNE, OF PHILADELPHIA, PENNSYLVANIA.

ARTIFICIAL-BIRD TARGET.

SPECIFICATION forming part of Letters Patent No. 224,254, dated February 3, 1880.

Application filed September 10, 1879.

*To all whom it may concern:*

Be it known that I, MAHLON WARNE, of Philadelphia, Pennsylvania, have invented a new and useful Improvement in Artificial-Bird Targets, of which the following is a specification.

My invention relates to a device by the aid of which sportsmen can practice the art of shooting without resorting to the use of live birds, or of the glass balls which have of late been substituted therefor, but which are objectionable, because the fragments of glass are scattered over the ground when the balls are shattered, and are more or less dangerous.

In the accompanying drawings, Figure 1 is a perspective view of the artificial bird and device for projecting the same; Fig. 2, the same, showing the artificial bird released; and Fig. 3, a full-sized end view, partly in section, of the artificial bird, which consists of a short tube, $a$, carrying wings $b$, preferably three in number, a screw passing through each wing and through a distance-piece, $d$, into the central tube, $a$, from which the wings are thus maintained at the distance indicated.

Each wing is rounded at its outer end, and is gradually reduced to a point at the opposite end, where it is bent outward, as shown in Figs. 1 and 2, the wings being preferably connected together at $x$. These wings may be made of stiff pasteboard or of thin sheet metal; but I prefer to make them of cloth-lined paper, such as is used in the manufacture of cuffs and collars.

The device for causing the flight of the artificial bird is made somewhat after the manner of a cross-bow.

The stock A is grooved longitudinally for the reception of the rod B, which is held in place by a staple, $e$, or equivalent device.

A bow, D, preferably of steel, passes through and is secured to the stock near the outer end of the same, the string $f$ of the bow passing through the rod B, as shown.

Notches $m$ are made in the upper edge of the stock at its inner end, for receiving the string of the bow, and a trigger, G, consisting of two bell-crank levers connected together, is pivoted to the said stock A near the aforesaid notches.

In using the instrument, a spike, $n$, in the inner end of the stock, is forced into the ground, the rod B being in the inclined position suggested by the desired flight of the artificial bird, which is adjusted on the outer end of the rod, as shown in Fig. 1.

In pulling a cord, $p$, attached to the long arms of the trigger, the short arms will raise the end of the rod, and with it the string $f$, so that the latter will escape from the notches $m$ $m$, and the recoil of the bow will suddenly force the rod outward and cause the flight of the artificial bird, the rod itself being limited in its movement by the string of the bow.

The wings of the artificial bird may be painted or otherwise colored at the points indicated by shade-lines.

As the wings will be more or less perforated by the shot at each fire, I propose to paste over the wings, prior to each flight of the artificial bird, a strip of paper of the same form as the wing, thereby overcoming the necessity of attaching an entirely new set of wings after each shot.

The device for projecting the artificial bird forms no part of this application, nor do I wish to limit myself to this particular device, as other means of projecting the artificial bird may be adopted.

I claim as my invention—

1. The within-described artificial bird, consisting of the tube or stock $a$, with wings $b$ attached thereto, and having unconfined ends projecting beyond the same, as set forth.

2. The combination of the tube or stock $a$, the wings $b$, the distance-pieces $d$, and the confining-screws, as specified.

In testimony whereof I have signed my name to this specification in the presence of two subscribing witnesses.

MAHLON WARNE.

Witnesses:
ALEX. PATTERSON,
HARRY SMITH.